(12) United States Patent
Tang et al.

(10) Patent No.: US 7,768,728 B2
(45) Date of Patent: Aug. 3, 2010

(54) DETECTING HEAD/DISK CONTACT USING TIMING JITTER

(75) Inventors: Yawshing Tang, Saratoga, CA (US); Carl Xiaodong Che, Saratoga, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 357 days.

(21) Appl. No.: 12/001,231

(22) Filed: Dec. 10, 2007

(65) Prior Publication Data
US 2009/0147390 A1  Jun. 11, 2009

(51) Int. Cl.
G11B 27/36 (2006.01)
(52) U.S. Cl. .............................. 360/31; 360/51; 360/75
(58) Field of Classification Search ....................... None
See application file for complete search history.

(56) References Cited

U.S. PATENT DOCUMENTS

| | | | | |
|---|---|---|---|---|
| 4,809,248 A | * | 2/1989 | Sengoku | 369/53.3 |
| 5,715,110 A | * | 2/1998 | Nishiyama et al. | 360/67 |
| 5,847,890 A | * | 12/1998 | Hattori | 360/51 |
| 5,917,670 A | * | 6/1999 | Scaramuzzo et al. | 360/53 |
| 6,008,640 A | * | 12/1999 | Tan et al. | 324/212 |
| 6,084,734 A | * | 7/2000 | Southerland et al. | 360/53 |
| 7,518,813 B1 | * | 4/2009 | Egan et al. | 360/25 |

OTHER PUBLICATIONS

WO 97/17621; Michael Inbar; Method and Apparatus for measuring the smoothness of a magnetic disk; May 15, 1997.*
K.B. Klassen et al., Non-Invasive Take-Off-Touch-Down Velocity Measurements, IEEE Transactions on Magnetics, vol. 30, No. 6, Nov. 1994 San Jose, CA.
J.K. Spong et al., Mechanically-Induced Readback Errors in Contact Recording, IEEE Transactions on Magnetics., vol. 30, No. 6, Nov. 1994, San Jose, CA.

* cited by examiner

*Primary Examiner*—Jason C Olson
(74) *Attorney, Agent, or Firm*—Ben J. Yorks; Irell & Manella LLP

(57) ABSTRACT

A disk drive that includes a head and a disk. The disk drive also includes a circuit that can detect head/disk contact from a jitter determined from a read signal provided by the head. The jitter may correspond to the time interval between two detected sync marks. Alternatively, the jitter may correspond to a change in frequency of a read clock generated from the read signal. These approaches allow for detection of head movement in a down track direction. Down track is a direction that is essentially parallel with the longitudinal axis of the head.

4 Claims, 3 Drawing Sheets

DETECTING HEAD/DISK CONTACT USING TIMING JITTER

BACKGROUND OF THE INVENTION

1. Field of the Invention

The present invention relates to detection of contact between a head and a disk of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

The disks are rotated by a spindle motor of the drive. Rotation of the disks creates an air flow within the disk drive. Each head has an air bearing surface that cooperates with the air flow to create an air bearing between the head and the adjacent disk surface. The air bearing eliminates or minimizes the mechanical wear between the head and the disk. The height of the air bearing is commonly referred to as the flying height of the head.

The magnetic field detected by the head is inversely proportional to the flying height of the head. Likewise, the strength of the magnetic field written onto the disk is also inversely proportional to the fly height. A larger fly height will produce a weaker magnetic field on the disk.

Due to various reasons the fly height of the heads may vary during operation of the drive. Such a variation in fly height may result in poorly written data on the disk. Weakly written data may create errors during a read routine. It would be desirable to monitor the fly height of the heads. It would also be desirable to provide such a monitoring function without significantly changing the components, cost, or operation of the drive.

There have been developed heads which include a heater coil. Current is provided to the heater coil to generate heat and thermally expand the head to move the read and write elements closer to the disk. These types of heads are sometimes referred to as fly on demand ("FOD") heads. The flying height of FOD heads can be varied by changing the amount of power provided to the heater coil.

It is desirable to create a flying height that is nearly zero. To achieve a minimum flying height it is desirable to know the point of contact between the head and the disk. Contact between the head and the disk can cause vibration and associated head movement. The vibration movement can be in a variety of directions. For example, the head can move perpendicular to and from the disk. This head movement will vary the amplitude of the read signal. There have been schemes developed to determine head contact by analyzing the amplitude of the read signal to detect mechanical vibration. The head contact may also cause cross-track vibration that varies the position error signal ("PES") used in the servo routine of the drive. There have also been schemes to determine head contact by analyzing the PES of the servo. Head assemblies that quickly damp perpendicular or cross-track vibration limit the amount of signal data that can be analyzed to determine head contact.

BRIEF SUMMARY OF THE INVENTION

A hard disk drive that includes a head that is coupled to a disk and provides a read signal. The disk drive further includes a circuit that detects a contact between the head and the disk from a jitter associated with the read signal.

DETAILED DESCRIPTION

Disclosed is a disk drive that includes a head and a disk. The disk drive also includes a circuit that can detect head/disk contact from a jitter determined from a read signal provided by the head. The jitter may correspond to the time interval between two detected sync marks. Alternatively, the jitter may correspond to a change in frequency of a read clock generated from the read signal. These approaches allow for detection of head movement in a down track direction. Down track is a direction that is essentially parallel with the longitudinal axis of the head. Such a scheme is particularly desirable for head gimbal assemblies that quickly damp vibration in the perpendicular and cross-track directions.

Figure 1:
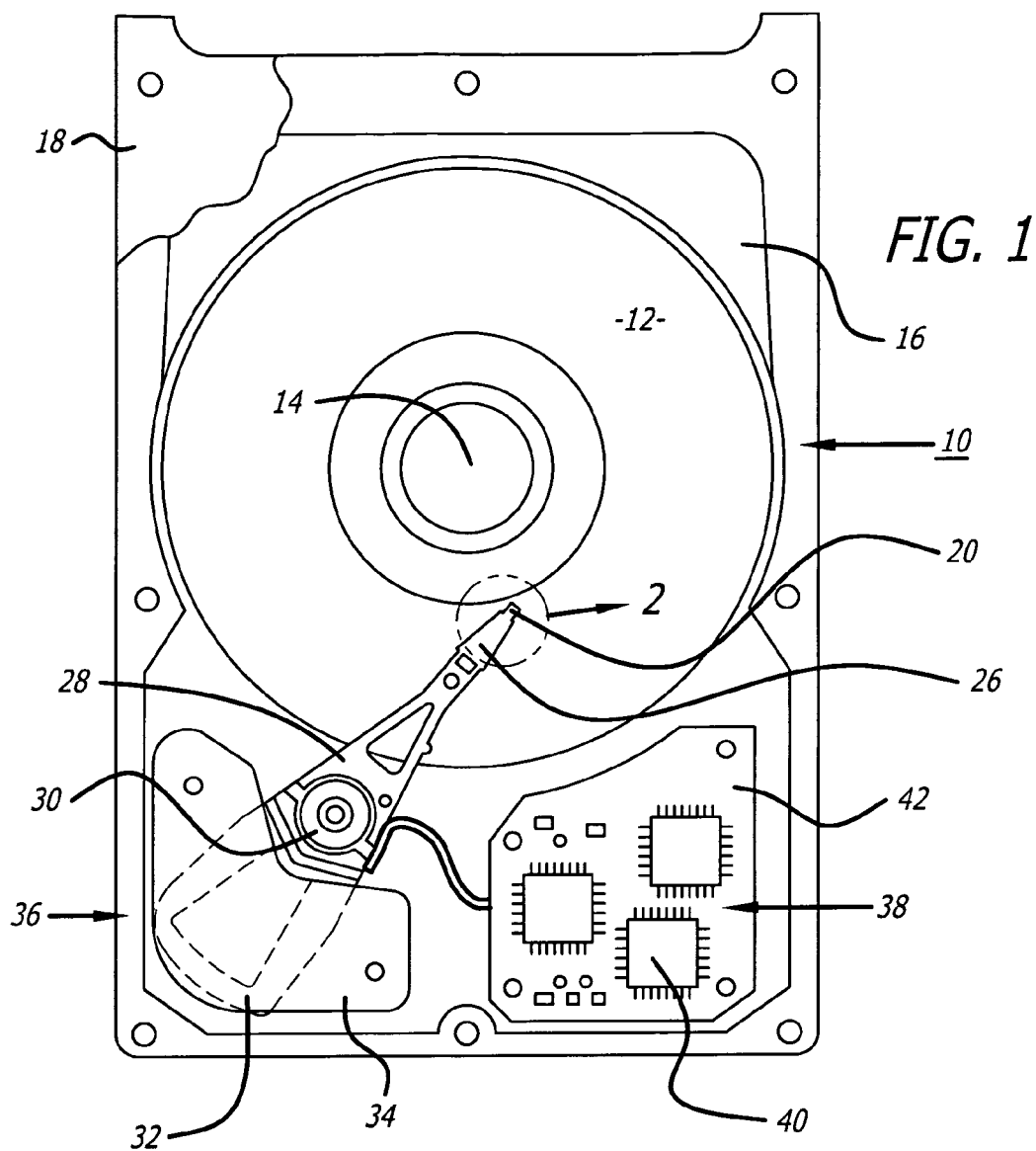
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
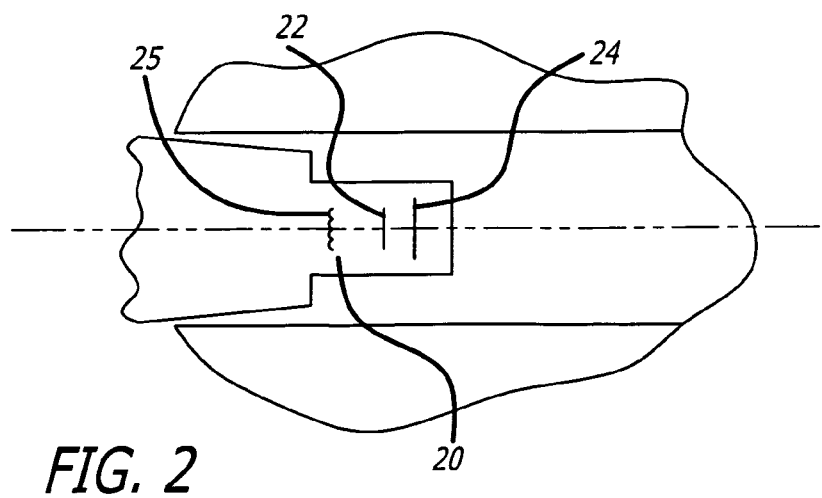
FIG. 2 is a top enlarged view of a head of the hard disk drive.

The disk drive 10 may include a plurality of heads 20 located adjacent to the disks 12. As shown in FIG. 2 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux. The head 20 may be a perpendicular recording head. The head 20 may also include a heater element (not shown). Such heads are commonly referred to as fly on demand ("FOD") heads.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 3:
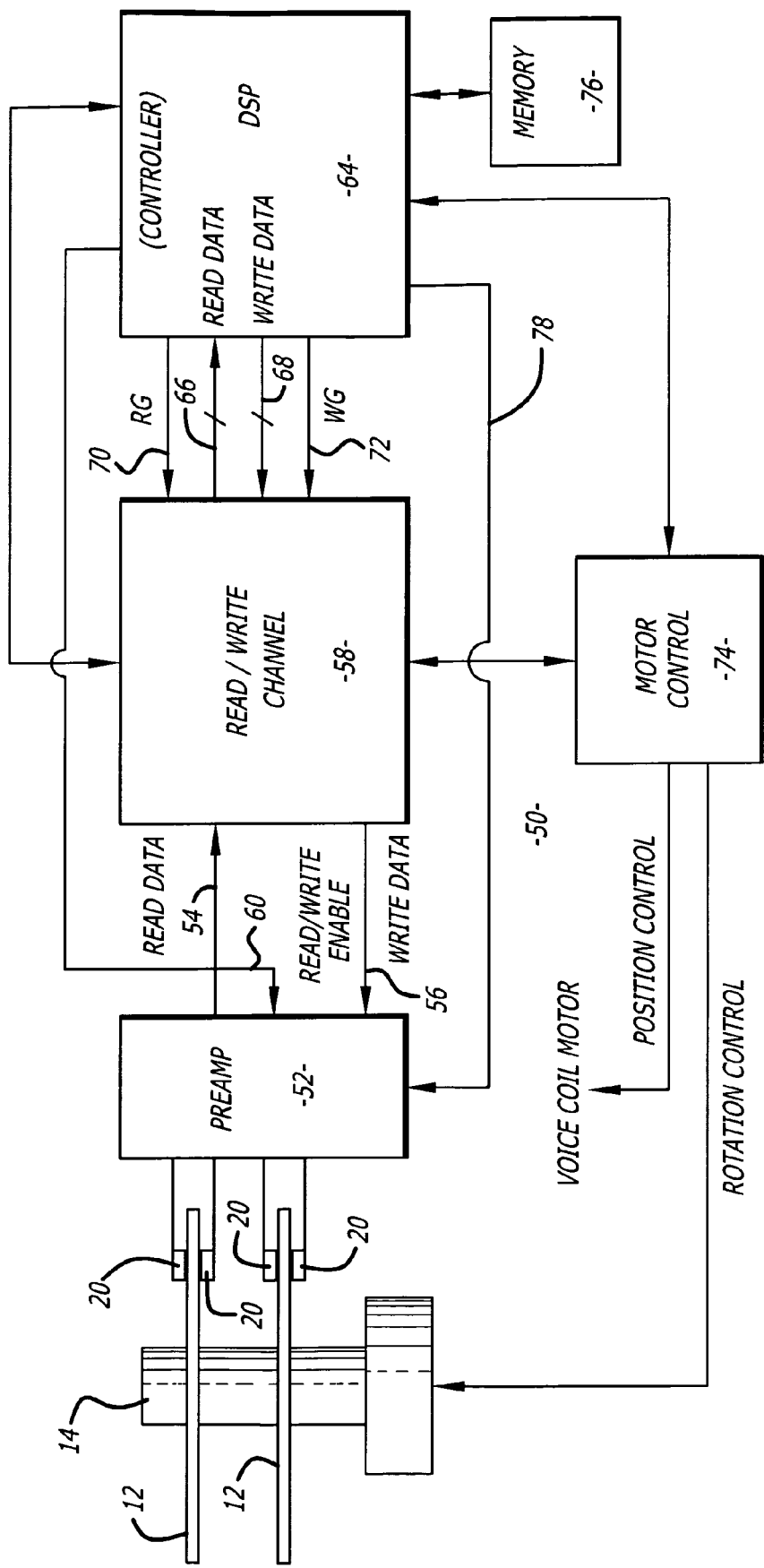
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the instructions to operate the controller and disk drive. Alternatively, the controller may have embedded firmware to operate the drive.

Figure 4:
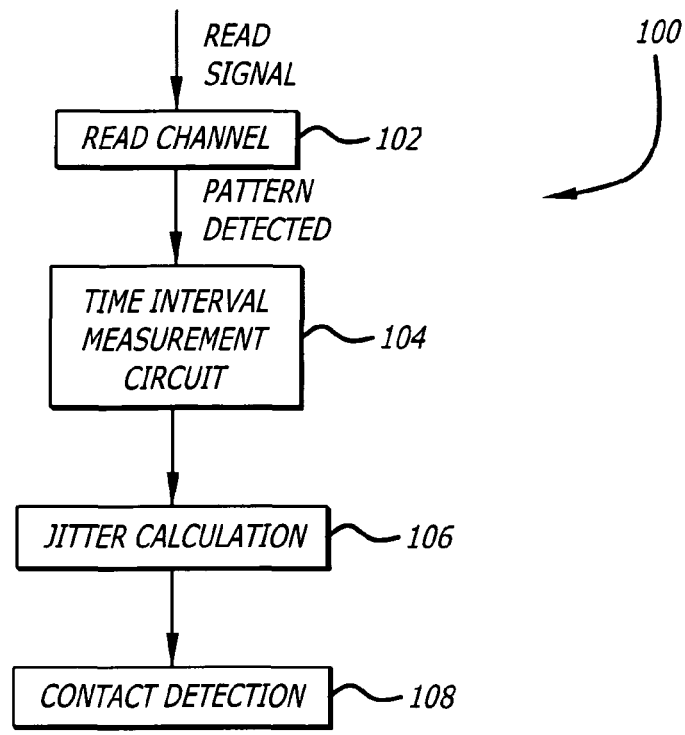
FIG. 4 is a schematic showing function blocks of a circuit that detects head/disk contact.

FIG. 4 is a schematic of a circuit 100 that can detect contact between a head and a disk. The circuit 100 includes a read channel 102 and a timing measurement circuit 104. The disks are typically organized to have a plurality of concentric tracks. Each track is divided into a plurality of sectors. Each sector has a servo field and one or more data fields. There is typically a sync mark associated with each servo field. Likewise, there is typically a sync mark associated with each data field. The sync marks are used to synchronize reading of the servo and data fields.

The read channel 102 can detect two different sync marks. The detection of the sync marks is provided to the measurement circuit which determines a time interval between the detection of the marks. A jitter calculation block 106 determines the deviation between the measured time interval and a stored time interval value. The stored time interval value is the time interval that should occur between detection of two marks if there is no head/contact. Head contact with a disk surface will reduce the head speed and increase the time interval between detected marks. It is advantageous to detect sync marks for the servo fields if head contact were to occur during a write operation because such marks exits before writing. Conversely, because there are typically more data sync marks such marks can be used to provide more sensitive to high frequency jitter.

A contact detection block 108 compares the computed jitter with a threshold value. If the jitter exceeds the threshold then a head contact signal is generated by detection block 108.

Figure 5:
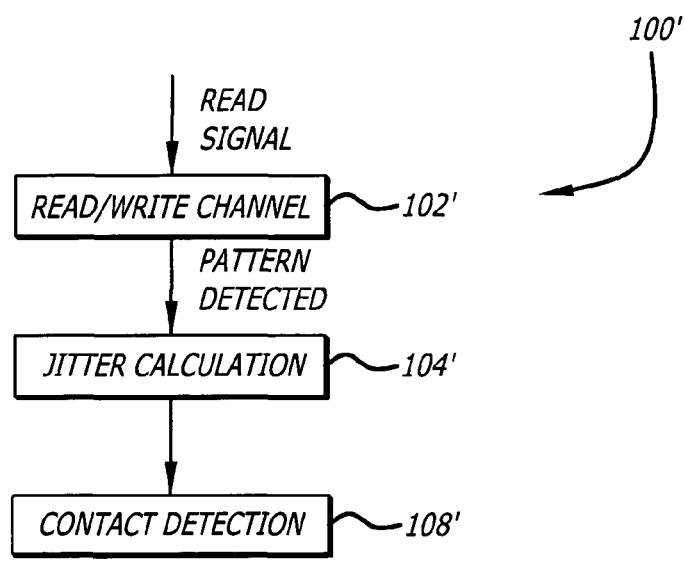
FIG. 5 is a schematic showing function blocks of an alternate embodiment of a circuit that detects head/disk contact.

FIG. 5 is a schematic of an alternate embodiment of the circuit 100'. The read channel 102' generates a read clock from the read signal. The read clock is generated with a phase lock loop that phase locks the clock signal to a frequency. The jitter calculation block 104' determines a jitter of the read clock frequency. The jitter can be the difference in clock frequency between the computed frequency and a stored frequency. The jitter can also be a rate change in frequency of the read clock. The stored frequency is a frequency of the clock signal when there is no head/disk contact.

The contact detection block 108' compares the computed jitter with a threshold value. The detection block 108' can output a head/contact detection signal when the computed jitter exceeds a threshold value.

The function blocks 102, 102', 104, 104', 106, 108 and 108' can all be performed by the controller 64 of the disk drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
a disk that includes two separated sync marks;
a head that is coupled to said disk and detects said sync marks; and,
a circuit that is coupled to said head and calculates a jitter from said detected sync marks, said circuit detects a contact between said head and said disk from said jitter.

2. The disk drive of claim 1, wherein said sync marks are servo sync marks.

3. A method for detecting contact between a head and a disk of a hard disk drive, comprising:
determining two separated sync marks;
a head that makes contact with a disk;
calculating a jitter from the detected sync marks; and, detecting the contact from the jitter.

4. The method of claim 3, wherein the sync marks are servo sync marks.

* * * * *